(12) United States Patent
Kittaka et al.

(10) Patent No.: US 6,847,770 B2
(45) Date of Patent: Jan. 25, 2005

(54) LENS FUNCTION-INCLUDING OPTICAL FIBER AND METHOD OF PRODUCING THE SAME

(75) Inventors: Shigeo Kittaka, Osaka (JP); Tadashi Koyama, Osaka (JP); Masami Kitano, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 81 days.

(21) Appl. No.: 10/024,512

(22) Filed: Dec. 21, 2001

(65) Prior Publication Data

US 2002/0090173 A1 Jul. 11, 2002

(30) Foreign Application Priority Data

Dec. 25, 2000 (JP) .......................................... 2000-391926

(51) Int. Cl.[7] .............................. G02B 6/00; G02B 6/02; G02B 6/32; G02B 6/26
(52) U.S. Cl. ............................. 385/124; 385/15; 385/33; 385/147
(58) Field of Search ............................. 385/31, 32, 39, 385/123, 124, 125, 15–25, 33–34, 147, 122; 398/79; 600/342

(56) References Cited

U.S. PATENT DOCUMENTS

| | | | | |
|---|---|---|---|---|
| 335,674 A | * | 2/1886 | Barley ......................... 34/95.2 |
| 3,395,331 A | * | 7/1968 | Snitzer ......................... 385/122 |
| 5,371,814 A | * | 12/1994 | Ames et al. .................... 385/25 |
| 5,815,614 A | * | 9/1998 | Pan .............................. 385/22 |
| 5,859,717 A | * | 1/1999 | Scobey et al. ................. 398/79 |
| 6,445,939 B1 | * | 9/2002 | Swanson et al. ............. 600/342 |

FOREIGN PATENT DOCUMENTS

| | | | | |
|---|---|---|---|---|
| JP | 60-91316 | * | 5/1985 | ................. 385/124 |
| WO | WO 00/58766 | | 10/2000 | |

OTHER PUBLICATIONS

European Search Report dated Apr. 1, 2004.

* cited by examiner

Primary Examiner—Akm Enayet Ullah
(74) Attorney, Agent, or Firm—Whitham, Curtis & Christofferson, P.C.

(57) ABSTRACT

A lens function-including optical lens according to the present invention is constituted by: at least one step-index optical fiber; and at least one gradient index optical fiber having an outer diameter equal to that of the step-index optical fiber and having a periodic length exhibiting a lens function, the gradient index optical fiber being joined or attached to an end surface of the step-index optical fiber. The present invention is especially effective in a single mode optical fiber which is typical of the step-index optical fiber. The gradient index optical fiber can be produced by an ion exchange method.

11 Claims, 3 Drawing Sheets

LENS FUNCTION-INCLUDING OPTICAL FIBER AND METHOD OF PRODUCING THE SAME

BACKGROUND OF THE INVENTION

The present invention relates to a single mode optical fiber widely used in an optical communication system, and particularly relates to optical coupling between optical fibers, optical coupling between an optical fiber and an optical device, and so on.

Increase in capacity of an optical fiber communication network has been demanded intensively with the rapid advance of popularization of Internet in recent years. Development of wavelength division multiplexing (WDM) of optical communication has progressed rapidly as means for increasing the capacity. As for basic constituent members of an optical communication system, a semiconductor laser is required as a light source, a photodiode is required as a photo detector, and an optical fiber, an optical amplifier or the like is required as an optical transfer medium. In addition, in WDM optical communication, optical devices with good wavelength selectability such as an optical demultiplexer, a filter and an isolator are required because wavelengths of light slightly different from each other can transmit information individually.

To construct an optical fiber communication network, these constituent members need to be coupled to one another optically with a small loss. It is therefore very important to use an optical coupling technique including various kinds of optical coupling such as coupling between a semiconductor laser or photo diode and an optical fiber, coupling in the case where an optical device (a filter or an isolator) is inserted in between optical fibers, coupling between optical fibers, coupling between an optical fiber and an optical waveguide, and so on.

Such optical coupling has been heretofore generally performed by joining optical fibers to each other directly or through a lens. In the case of joining of optical fibers to each other directly, loss is not so high, but permissible tolerance of alignment is very strict to thereby result in increase in assembling cost. In the case of using a lens, a gradient index rod lens is used for various kinds of application because the lens is shaped cylindrically and matches the optical fibers geometrically so as to be suitable for direct insertion into a sleeve shaped like a hollow cylinder, for arrangement in a V groove, and so on (for example, JP-A-60-91316).

The refractive-index distribution of the gradient index rod lens can be given by the expression:

$$n(r)^2 = n_0^2 \cdot \{1 - (g \cdot r)^2 + h_4 (g \cdot r)^4 + h_6 (g \cdot r)^6 + h_8 (g \cdot r)^8 + \ldots \}$$

in which r is a distance from the optical axis, n(r) is a refractive index in a position at the distance r from the optical axis, $n_0$ is a refractive index on the optical axis, $r_0$ is the radius of the rod lens, g is a refractive-index distribution coefficient, and $h_4$, $h_6$, $h_8$ ... are refractive-index distribution coefficients respectively.

The lens function of the gradient index rod lens varies according to the lens length Z.

The following basic usage can be made on the basis of the periodic length P defined by the expression:

$$P = 2\pi / g$$

(1) The case of Z=0.25P: Light of a light source disposed on an end surface is collimated.

(2) The case of Z=0.50P: Light of a light source disposed on an end surface is focussed on an opposite end surface.

The rod lens, however, generally has a diameter of about 1 mm which is considerably different from 125 $\mu$m that is the outer diameter of a standard single mode optical fiber. For this reason, it is necessary to prepare an exclusive-use holder for holding both the rod lens and the optical fiber or to hold an end portion of the optical fiber by use of a capillary having a diameter equal to that of the rod lens. Hence, the number of parts increases and assembling becomes complex. Moreover, the resulting system occupies a large volume as a whole. As a result, this causes increase in cost.

As means for solving these problems, there has been an attempt that a lens having a diameter equal to that of an optical fiber is disposed at a forward end of the optical fiber. For example, in Journal of Lightwave Technology, Vol.17, No.5, P.924, 1999, there has been proposed a structure in which a gradient index optical fiber (GIF) of quartz glass having a diameter equal to that of a single mode optical fiber (SMF) is fused to a forward end of the SMF through a homogeneous quartz glass spacer. In such a structure, these optical fibers can be arranged in a V groove or the like easily, so that great reduction in production cost can be expected.

In the aforementioned example, however, the refractive-index distribution cannot be controlled sufficiently because an existing quartz glass multi-mode optical fiber for communication is used. Hence, performance sufficient to be used for the lens function cannot be brought out yet. Moreover, the lens function of the GIF for communication is concentrated into the core portion near the optical axis. For this reason, refracting power (the value of the refractive-index distribution coefficient q in the aforementioned expression giving the refractive-index distribution) is so large that the collimated luminous flux becomes thin.

In order to thicken the collimated luminous flux, it is necessary to separate end surfaces of these two optical fibers by a specific distance. In the aforementioned example, a spacer is interposed to define this distance. For this reason, the number of parts does not change compared with the case of use of a holder or a capillary though there is an advantage in that the outer diameters of the two optical fibers can be made coincident with each other. Hence, there is still a problem that the original purpose cannot be achieved.

SUMMARY OF THE INVENTION

The present invention is devised to solve the problem and an object of the present invention is to provide an optical fiber which has a diameter equal to that of an information transmission optical fiber and to which a lens function is given without addition of any special parts.

To solve the aforementioned problem, the present invention provides a lens function-including optical fiber constituted by: at least one information transmission optical fiber; and at least one gradient index optical fiber having an outer diameter equal to that of the information transmission optical fiber and having a length exhibiting a specific lens function, the gradient index optical fiber being jointed or contacted with an end surface of the information transmission optical fiber. Atypical example of the information transmission optical fiber is a single mode optical fiber.

On the other hand, the gradient index optical fiber is configured so that the refractive-index distribution in the wavelength range used can be given by the expression:

$$n(r)^2 = n_0^2 \cdot \{1 - (g \cdot r)^2 + h_4 (g \cdot r)^4 + h_6 (g \cdot r)^6 + h_8 (g \cdot r)^8 + \ldots \}$$

in which r is a distance from the optical axis, n(r) is a refractive index in a position at the distance r from the optical axis, $n_0$ is a refractive index on the optical axis, $r_0$ is the radius of the gradient index optical fiber, g is a refractive-index distribution coefficient, and $h_4$, $h_6$, $h_8$ . . . are high-order refractive-index distribution coefficients respectively.

On this occasion, it is preferable to satisfy the condition: $0.1 \leq n_0 \cdot g \cdot r_0 \leq 0.5$. It is more preferable to satisfy the condition: $0.12 \leq n_0 \cdot g \cdot r_0 \leq 0.25$.

On this occasion, the refractive index $n_0$ on the optical axis of the gradient index optical fiber is preferably in a range of from 1.40 to 1.80 (both inclusively) and more preferably in a range of from 1.50 to 1.70 (both inclusively).

In addition, the length of the gradient index optical fiber is preferably in a range of from 0.05P to 1P (both inclusively) in which P is the periodic length of the gradient index optical fiber. The length of the gradient index optical fiber is more preferably in a range of from 0.05P to 0.5P (both inclusively) when the gradient index optical fiber is used for a collimator.

The information transmission optical fiber and the gradient index optical fiber are joined and fixed to each other in the condition that the two optical fibers are inserted in a sleeve having an inner diameter substantially equal to the outer diameter of the two optical fibers to thereby achieve a lens function-including optical fiber according to the present invention. Alternatively, the information transmission optical fiber and the gradient index optical fiber may be joined and fixed to each other in a groove which is formed in a planar substrate and which is V-shaped in section.

The gradient index optical fiber used in the lens function-including optical fiber according to the present invention is produced by the following steps. First, a homogeneous glass rod is immersed in molten salt to perform ion exchange to thereby form a refractive-index distribution in the glass rod. In the condition that the glass rod is retained vertically, the glass rod is stretched while being heated to thereby form a gradient index optical fiber having a desired outer diameter. The optical fiber is cut into a length corresponding to a specific periodic length of the gradient index optical fiber. This optical fiber is joined or contacted with a forward end of an information transmission optical fiber. Thus, a lens function-including optical fiber can be produced.

The present disclosure relates to the subject matter contained in Japanese patent application No.2000-391926(filed on Dec. 25, 2000), which is expressly incorporated herein by reference in its entirety.

DESCRIPTION OF THE PREFERRED EMBODIMENT

Figure 1:
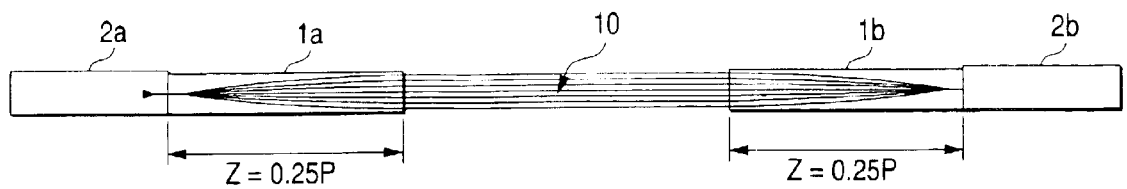
FIG. 1 is an optical path view showing a configuration example of the present invention.

An embodiment of the present invention will be described below specifically.

In the present invention, a gradient index optical fiber (GIF) is joined or attached to a forward end of a single mode optical fiber (SMF) which is a typical information transmission optical fiber. The outer diameter of the GIF is preferably made equal to the outer diameter (normally, 125 $\mu$m) of the SMF. Hence, the two fibers can be optically coupled easily, so that the number of parts required for coupling of the fibers can be reduced.

As described preliminarily in the description of the background art, if an existing GIF is used, the GIF can have a diameter the same as that of the SMF. However, because such a GIF is not intended to use a lens function, it is not always excellent in performance concerning aberration or the like which is important to the lens. In addition, because the GIF is normally composed of a 50 $\mu$m-diameter core portion and a clad portion outside the core portion, the GIF is not designed to transmit light to the outer circumferential portion. For this reason, when, for example, light emitted from an SMF is collimated in use, the light emitted from the SMF is confined in the core portion.

As a result, the diameter of the collimated light beam emitted thus becomes as narrow as the core diameter. This is undesirable from the point of view of application. Therefore, means for forming an interval between the two optical fibers, or the like, is required.

On the other hand, such a small-diameter GIF can be hardly produced by direct use of the background-art method of producing a gradient index rod lens. For this reason, it is impossible to use a GIF which has an outer diameter of 125 $\mu$m and in which almost of the physical outer diameter can be utilized optically.

A method of producing a lens function-including optical fiber according to the present invention will be described below.

A 125 $\mu$m-diameter GIF was produced by spinning a 1.1 mm-diameter gradient index rod lens (base material rod).

The base material rod was produced as follows. A 1.1 mm-diameter homogeneous glass rod containing lithium oxide was immersed in molten salt to perform an ion exchange process to thereby form a refractive index distribution corresponding to the lithium concentration distribution. The optical characteristic of the base material rod obtained thus was as follows.

Outer diameter: Φ1.1 mm $n_0$: 1.610 g: 0.232 mm$^{-1}$ (measurement wavelength: 632.8 nm)

The base material rod was cut into a length of 300 mm. The base material rod was hung vertically while held by a holder. Then, the base material rod was drawn downward while heated by a ring-like heater. Thus, spinning was performed. The temperature of the heater was in a range of from 680° C. to 730° C. and the speed of spinning was adjusted to about 1 m/min so that the outer diameter after spinning was 125 $\mu$m.

The characteristic of the GIF obtained after spinning was as follows.

Outer diameter: Φ0.125 mm $n_0$: 1.610 g: 2.06 mm$^{-1}$ (measurement wavelength: 632.8 nm)

There refractive-index distribution was not disordered largely and the spherical aberration was sufficiently small up to the peripheral portion of the fiber. Thus, an image formed in a diffraction limit can be obtained.

The fiber can be cut into a suitable size with opposite end surface abraded for use in each of the embodiments as follows.

Figure 2:
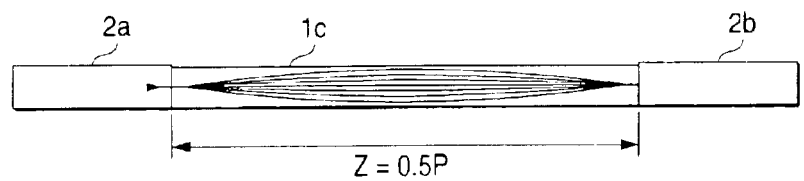
FIG. 2 is an optical path view showing another configuration example of the present invention.
Figure 3:
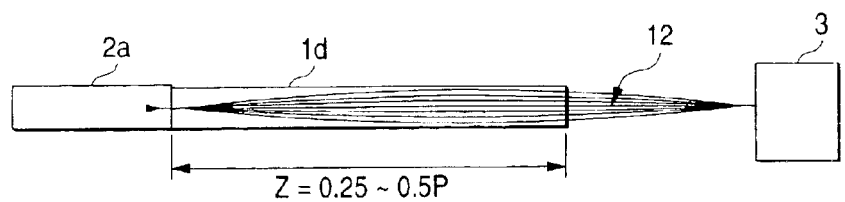
FIG. 3 is an optical path view showing a further configuration example of the present invention.

FIGS. 1, 2 and 3 are optical path views in the case where at least one GIF having an outer diameter of 125 μm and produced by the aforementioned method is combined with at least one SMF having a diameter equal to that of the GIF.

FIG. 1 shows an example in which an end surface of an SMF 2a and an end surface of a GIF 1a cut into a length Z=0.25P are butt-joined to each other so that light emitted from the SMF 2a is radiated as collimated light 10 to a space and optically coupled to an SMF 2b again by the lens function of an GIF 1b having a length Z=0.25P.

FIG. 2 shows an example in which two SMFs 2a and 2b are directly coupled to each other by a GIF 1c having a length Z=0.5P.

FIG. 3 shows an example in which the length Z of a GIF 1d is selected to be in a range of 0.25P<Z<0.50P so that light emitted from an SMF 2a is focussed as an image of converged light 12 on an optical device 3.

The lower limit of the refractive index no on the optical axis of the GIF is about 1.4 when glass or plastic is used as a material for the GIF. When glass is used as a material for the rod lens, it is necessary to increase the amount of high-refractive-index components such as lead oxide, lanthanum oxide, etc. in order to set the center refractive index no to be higher than 1.8. If the amount of these components were too large, there would arise a problem that the speed of ion exchange might become extremely slow or the glass might be devitrified easily. Accordingly, the preferred range of the refractive index $n_0$ is $1.40 \leq n_0 \leq 1.80$. In the case of a glass material, however, the range of no permitting achievement of a composition for easier production of GIF is $1.50 \leq n_0 \leq 1.70$. Accordingly, the value of $n_0$ is especially preferably selected to be in this range.

The brightness of the GIF is defined by an angular aperture $\theta = n_0 \cdot g \cdot r_0$ (rad) which indicates a range permitting intake of light. If the angular aperture θ were smaller than 0.1 rad, the peripheral portion of a Gaussian beam emitted from the SMF (generally having a numerical aperture NA equal to about 0.1, $NA = n_0 \sin\theta$) would be unable to be taken in. Hence, coupling loss would become large. On the other hand, it is difficult to produce such an optical fiber with the value of θ larger than To sufficiently take in light emitted from the SMF with NA=0.1 and to enlarge the diameter of the collimated luminous flux, the value of θ is especially preferably selected to be in a range of from 0.12 (inclusively) to 0.25 (not inclusively)

The quantity of aberration of the gradient index rod lens (GIF on this occasion) is determined by the refractive-index distribution coefficients $h_4, h_6, h_8, \ldots$. Assuming $h_4 = +0.67$ in the case where the outer diameter of the GIF is 125 μm, sufficient performance can be obtained because the quantity of spherical aberration is substantially not larger than a diffraction limit when NA is not larger than 0.2. To reduce the quantity of aberration more greatly, the values of $h_6, h_8$, ... may be preferably optimized.

Although the above description has been made upon the case where a quartz SMF with an outer diameter of 125 μm is used as an information transmission optical fiber, the outer diameter of the information transmission optical fiber need not be 125 μm because the outer diameter of the GIF can be adjusted accordingly as described above. For example, the present invention may be applied also to an optical fiber having a large outer diameter such as a multicomponent glass optical fiber or a plastic optical fiber. If the outer diameter is not smaller than about 400 μm, especially the step of reducing the diameter by stretching or the like is not necessary because the gradient index rod lens can be produced by the background-art ion exchange method.

Specific applied embodiments of the present invention will be listed below. Although these embodiments will be described by taking an SMF having an outer diameter of 125 μm as an example, the outer diameter and material of the optical fiber is not limited thereto specifically.

(Coupling between Optical Fibers)

Figure 4:
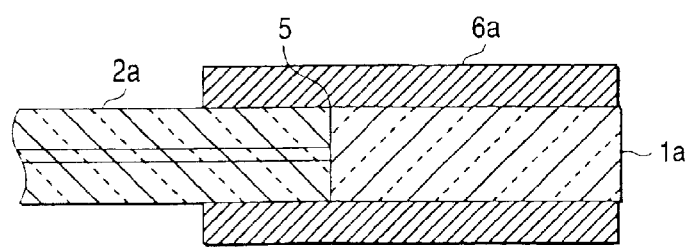
FIG. 4 is a view showing an embodiment of the present invention.

When optical fibers are to be coupled to each other on the basis of the arrangement shown in FIG. 1, SMFs and GIFs on opposite sides are joined to each other by adhesive agents or the like respectively so as to be integrated into one body. Because thick collimated luminous flux can be obtained by the integration, coupling loss can be suppressed against the optical axis displacement between the opposite-side optical fibers and the change of the distance therebetween. Hence, adjustment in coupling SMFs can be simplified so that coupling between SMFs with a small coupling loss can be achieved easily. As shown in FIG. 4 which is a sectional view, a sleeve 6 with an inner diameter of 125 μm is used and optical fibers 1a and 2a are inserted into the sleeve 6a from opposite sides and contactingly joined to each other to thereby perform assembling easily. In addition, the joint portion 5 is reinforced so that reliability can be improved.

Figure 5:
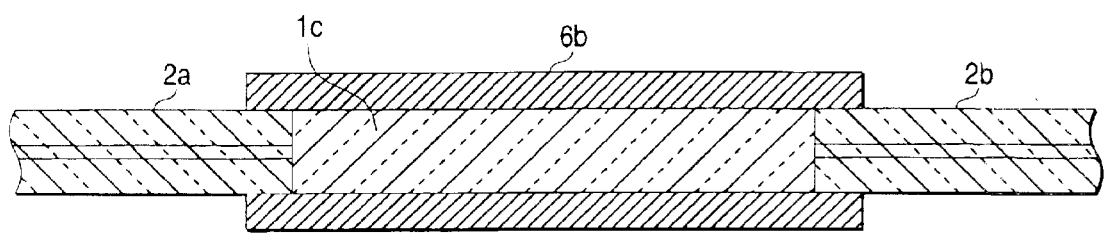
FIG. 5 is a view showing another embodiment of the present invention.

When coupling is to be made on the basis of the arrangement shown in FIG. 2, a GIF 1c of Z=0.5P is inserted in the middle of a sleeve 6b with an inner diameter of 125 μm and then SMFs 2a and 2b are inserted into the sleeve 6b from opposite sides to come into contact with and be fixed to the GIF 1c as shown in FIG. 5. On this occasion, high coupling efficiency can be obtained easily without necessity of aligning the optical axis. When the two fibers are bonded or the gap is filled with a liquid in place of simple contact between the two fibers, reflection loss can be also reduced.

Coupling between the two optical fibers can be made easily by use of an ultraviolet-curable resin, an epoxy adhesive agent, or the like. In addition, a metal sleeve or a glass sleeve can be used as the sleeve.

(Insertion of Optical Device)

Figure 6:
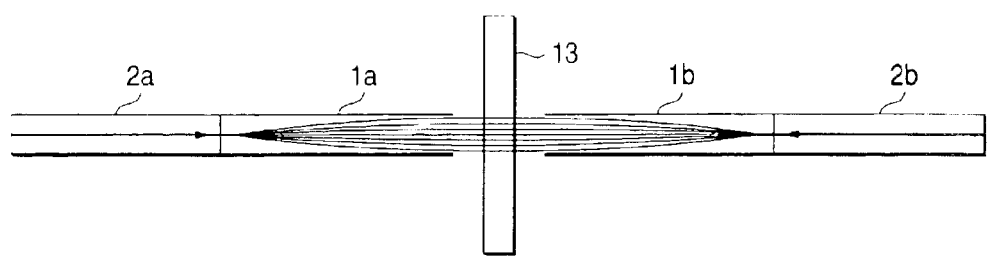
FIG. 6 is a view showing an applied embodiment of the present invention.

As shown in FIG. 6, an optical device 13 such as a multilayer-film filter, an isolator or a polarizing plate can be inserted in the collimated luminous flux portion obtained on the basis of the arrangement shown in FIG. 1.

Figure 7:
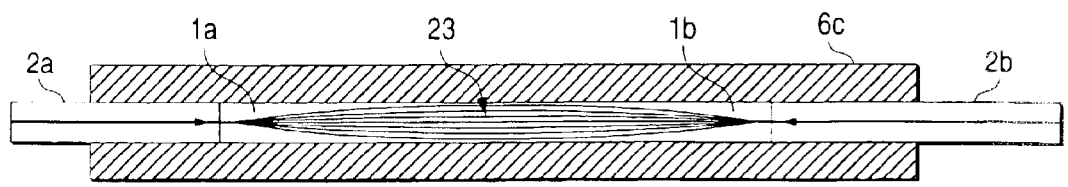
FIG. 7 is a view showing another applied embodiment of the present invention.

Alternatively, as shown in FIG. 7, the optical device 23 may be also processed into a cylindrical shape with an outer diameter of 125 μm so that the optical device 23 can be perfectly inserted into the sleeve 6c. Because the outer diameter of each of the optical fibers 1a, 1b, 2a and 2b is equal to that of the optical device 23, the optical axis need not be aligned. There is an effect that assembling can be made easily.

(Condensation of Light emitted from Optical Fiber)

In the arrangement shown in FIG. 3, a focal point of light emitted from the SMF 2a is formed so that a photo detector, an optical recording disk record surface, or the like, can be set at the focal point. Further, light from a diverging light source may be coupled to the SMF.

(Mounting on Substrate)

Figure 8:
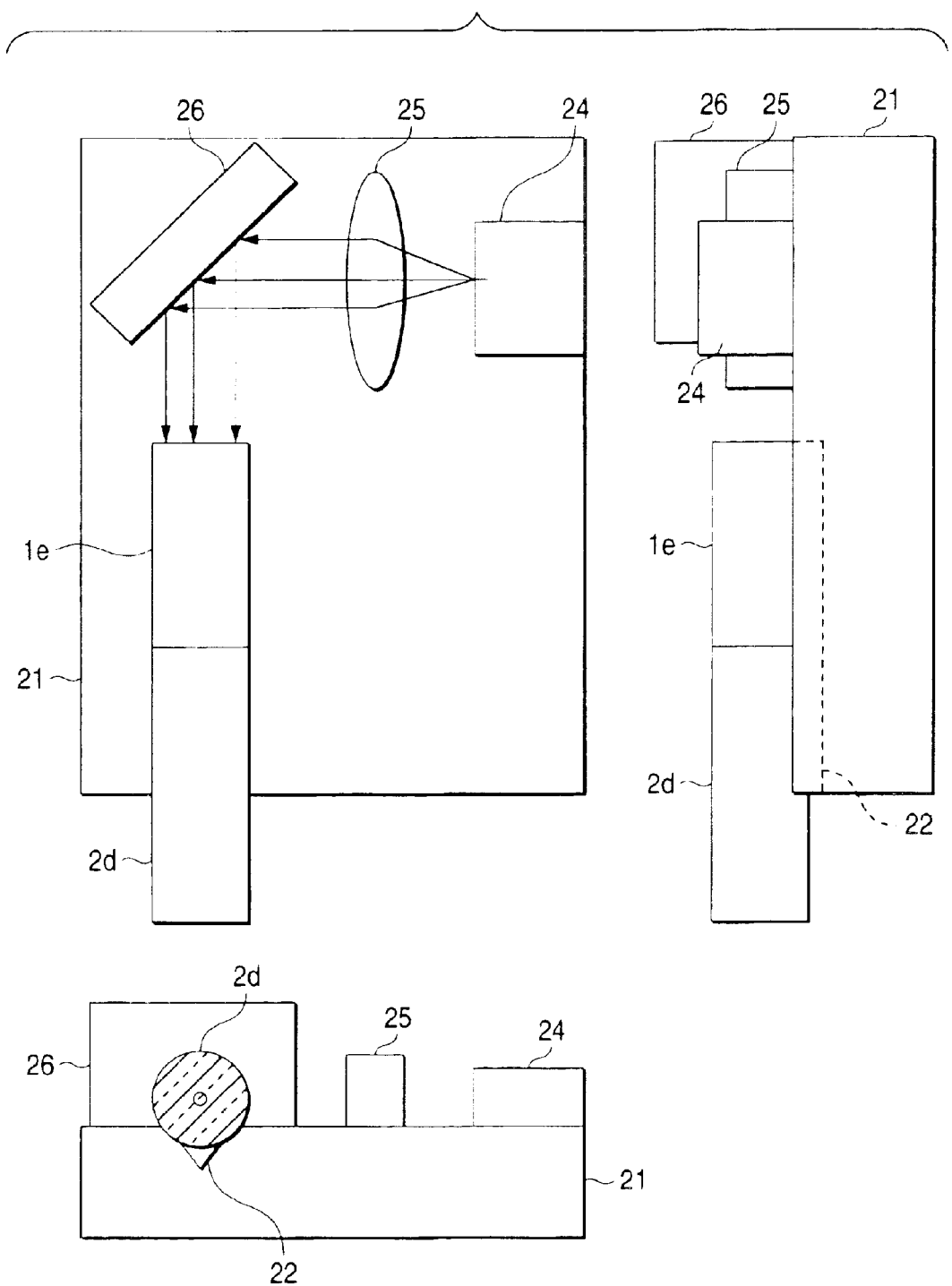
FIG. 8 is a view showing a further applied embodiment of the present invention.

In the mounting of an optical coupling system constituted by a combination of at least one SMF and at least one rod lens, a V groove obtained by processing a silicon substrate or the like was used widely. V grooves having depths adapted to the outer diameters of the SMF and rod lens respectively were prepared so that the SMF and lens placed in the V grooves respectively were coupled to each other. According to the present invention, because the SMF and the GIF are equal in outer diameter to each other, an SMF 2d and a GIF 1e can be mounted easily and accurately by a simple means of forming one V groove 22 in a portion of a substrate 21, placing the SMF 2d and the GIF 1e in the V groove and joining the SMF 2d and the GIF 1e to each other as shown in FIG. 8. Accordingly, a very compact optical circuit can be achieved easily when optical devices such as a semiconductor laser 24, a lens 25, a reflecting mirror 26, and so on, are integrated on one and the same substrate.

The aforementioned configuration example has shown the case where the length of the GIF is in a range of from 0.25P to 0.5P. The lens function-including optical fiber, however, generally exhibits various functions when Z is in a range of from 0.05P to 0.1P (both inclusively). If Z<0.05P, loss in the quantity of light increases because of reduction in NA. Moreover, the GIF can be hardly used because Z is too small to produce the GIF and assemble the GIF into the lens function-including optical fiber. On the other hand, it is generally meaningless to use a lens having a length of not smaller than 1P because the characteristic of the lens can be achieved by a lens having a length smaller than 1P and because the lens length is so large that the size becomes large.

Incidentally, in the case where the GIF is used as a normal collimator lens or condensing lens, characteristic is repeated when Z is not smaller than 0.5. Hence, the use of a GIF with Z>0.5P is meaningless from the point of view of focussing. To suppress the quantity of aberration, Z is most preferably selected to be in a range of from 0.05P to 0.5P (both inclusively) When an erecting image needs to be formed, Z in a range of from 0.5P to 1.0P is also useful.

According to the present invention, a lens function-including optical fiber which can be assembled easily from a small number of parts and which can be small-sized is achieved by joining or attaching a gradient index optical fiber to an information transmission optical fiber having an outer diameter equal to that of the gradient index optical fiber.

What is claimed is:

1. A lens function-including optical fiber comprising:
at least one information transmission optical fiber; and
at least one gradient index optical fiber having an outer diameter equal to that of said information transmission optical fiber and having a length exhibiting a specific lens function, said gradient index optical fiber being jointed or contacted with an end surface of said information transmission optical fiber,
and wherein, when a refractive-index distribution of said gradient index optical fiber in a wavelength range used is given by the expression:

$$n(r)^2 = n_0^2 \cdot \{1 - (g \cdot r)^2 + h_4(g \cdot r)^4 + h_6(g \cdot r)^6 + h_8(g \cdot r)^8 + \ldots\},$$

said gradient index optical fiber satisfies a condition:
$0.1 \leq n_0 \cdot g \cdot r_0 \leq 0.5$ in which r is a distance from an optical axis, n(r) is a refractive index in a position at the distance r from the optical axis, $n_0$ is a refractive index on the optical axis, $r_0$ is a radius of said gradient index optical fiber, g is a refractive-index distribution coefficient, and $h_4, h_6, h_8 \ldots$ are high-order refractive-index distribution coefficients respectively.

2. A lens function 13 including optical fiber according to claim 1, wherein said information transmission optical fiber is a single mode optical fiber.

3. A lens function-including optical fiber according to claim 1, wherein said gradient index optical fiber is produced by an ion exchange method.

4. A lens function-including optical fiber according to claim 1, wherein said gradient index optical fiber satisfies a condition:

$$0.12 \leq n_0 \cdot g \cdot r_0 \leq 0.25.$$

5. A lens function-including optical fiber according to claim 1, wherein the refractive index $n_0$ on the optical axis of said gradient index optical fiber is in a range of from 1.40 to 1.80 (both inclusively).

6. A lens function-including optical fiber according to claim 1, wherein the refractive index $n_0$ on the optical axis of said gradient index optical fiber is in a range of from 1.50 to 1.70 (both inclusively).

7. A lens function-including optical fiber according to claim 1, wherein a length of said gradient index optical fiber is in a range of from 0.05P to 1P (both inclusively) in which P is a periodic length of said gradient index optical fiber.

8. A lens function-including optical fiber according to claim 1, wherein the length of said gradient index optical fiber is in a range of from 0.05P to 0.5P (both inclusively) in which P is the periodic length of said gradient index optical fiber.

9. A lens function-including optical fiber according to claim 1, wherein said information transmission optical fiber and said gradient index optical fiber are joined and fixed to each other in a condition that said two optical fibers are inserted in a sleeve having an inner diameter substantially equal to said outer diameter of said two optical fibers.

10. A lens function-including optical fiber comprising:
at least one information transmission optical fiber; and
at least one gradient index optical fiber having an outer diameter equal to that of said information transmission optical fiber and having a length exhibiting a specific lens function, said gradient index optical fiber being jointed or contacted with an end surface of said information transmission optical fiber,
wherein said information transmission optical fiber and said gradient index optical fiber are joined and fixed to each other in a groove which is formed in a planar substrate and which is V-shaped in section.

11. A method of producing a lens function 13 including optical fiber, comprising the steps of:
immersing a homogeneous glass rod in molten salt to perform ion exchange to thereby form a refractive-index distribution in said glass rod;
forming a gradient index optical fiber with a desired outer diameter by stretching said glass rod while heating said glass rod retained vertically; and
cutting said gradient index optical fiber into a length corresponding to a specific periodic length of said gradient index optical fiber.

* * * * *

UNITED STATES PATENT AND TRADEMARK OFFICE
CERTIFICATE OF CORRECTION

PATENT NO. : 6,847,770 B2
DATED : January 25, 2005
INVENTOR(S) : Kittaka et al.

It is certified that error appears in the above-identified patent and that said Letters Patent is hereby corrected as shown below:

Column 8,
Line 1, replace "A lens function 13 including optical fiber" with -- A lens function including optical fiber --.
Lines 46-47, replace "A method of producing a lens function 13 including optical fiber" with -- A method of producing a lens function including optical fiber --.

Signed and Sealed this

Sixteenth Day of August, 2005

JON W. DUDAS
*Director of the United States Patent and Trademark Office*